(12) United States Patent
Schweig

(10) Patent No.: US 8,397,004 B2
(45) Date of Patent: *Mar. 12, 2013

(54) KEYBOARD, MOUSE, AND VIDEO (KVM) SESSION CAPTURE SYSTEM THAT STORES AND CAN PLAYBACK PORTIONS OF LIVE KVM SESSION VIA FORENSIC CAPTURE MODULE

(75) Inventor: Marc E. Schweig, Basking Ridge, NJ (US)

(73) Assignee: Raritan Americas, Inc., Somerset, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/164,233

(22) Filed: Jun. 30, 2008

(65) Prior Publication Data

US 2009/0013109 A1 Jan. 8, 2009

Related U.S. Application Data

(62) Division of application No. 11/344,443, filed on Jan. 31, 2006, now Pat. No. 7,478,182.

(51) Int. Cl.
*G06F 3/00* (2006.01)
*G06F 13/00* (2006.01)
*G06F 7/00* (2006.01)

(52) U.S. Cl. ............. 710/73; 710/104; 710/8; 710/9; 710/10; 710/29; 710/30; 710/62; 710/67; 715/704; 709/6; 709/220; 709/238; 711/100; 711/162

(58) Field of Classification Search ............. 710/8–10, 710/104–106, 313, 100, 300, 310, 312, 62, 710/72; 711/100, 162
See application file for complete search history.

(56) References Cited

U.S. PATENT DOCUMENTS

| | | | |
|---|---|---|---|
| 5,721,842 A | 2/1998 | Beasley | |
| 5,732,212 A | 3/1998 | Perholtz | |
| 5,884,096 A | 3/1999 | Beasley | |
| 5,937,176 A | 8/1999 | Beasley | |
| 6,112,264 A | 8/2000 | Beasley | |
| 6,345,323 B1 | 2/2002 | Beasley | |
| 6,380,924 B1* | 4/2002 | Yee et al. | 345/156 |
| 6,771,213 B2 | 8/2004 | Durst | |
| 6,857,005 B2 | 2/2005 | Kistler et al. | |
| 6,895,480 B2* | 5/2005 | Heil | 711/153 |
| 6,915,362 B2* | 7/2005 | Ramsey et al. | 710/62 |
| 7,085,385 B2* | 8/2006 | Frantz et al. | 380/277 |
| 7,099,893 B2 | 8/2006 | Bischof et al. | |
| 7,114,102 B2* | 9/2006 | Chan et al. | 714/37 |
| 7,240,111 B2* | 7/2007 | VanHarlingen et al. | 709/224 |
| 7,308,515 B2* | 12/2007 | Yang | 710/72 |
| 7,536,642 B2* | 5/2009 | Wilbrink et al. | 715/255 |
| 7,680,809 B2* | 3/2010 | Deng et al. | 707/706 |
| 7,680,888 B1* | 3/2010 | Marmaros et al. | 709/206 |
| 7,725,508 B2* | 5/2010 | Lawarence et al. | 707/830 |

(Continued)

OTHER PUBLICATIONS

File History of Reissue U.S. Patent No. 5,732,212, Apr. 11, 2002. Part 1.

(Continued)

*Primary Examiner* — Tammara Peyton

(57) ABSTRACT

Keyboard, mouse and video (KVM) capture session architecture that includes command center forensics. That is, redirector hardware (HW) and a command center forensics (CCF) appliance. The redirector HW includes a computer interface module (CIM) with a computer readable encoded media. The CIM is configured to record at least one KVM session. The computer readable encoded media is configured to instruct sending an identical copy of the recorded at least one KVM session to the CCF appliance. The CCF appliance being configured to store and playback the identical copy.

15 Claims, 3 Drawing Sheets

U.S. PATENT DOCUMENTS

| | | | |
|---|---|---|---|
| 7,984,157 B2* | 7/2011 | Panasyuk et al. | 709/227 |
| 2002/0116539 A1* | 8/2002 | Bryczkowski et al. | 709/317 |
| 2003/0142122 A1 | 7/2003 | Straut et al. | |
| 2004/0059782 A1 | 3/2004 | Sivertsen | |
| 2004/0181590 A1* | 9/2004 | Liou et al. | 709/217 |
| 2005/0033777 A1 | 2/2005 | Moraes et al. | |
| 2005/0055383 A1 | 3/2005 | Dias et al. | |
| 2005/0071026 A1 | 3/2005 | Jaeger | |
| 2005/0097149 A1 | 5/2005 | Vaitzblit et al. | |
| 2005/0144353 A1* | 6/2005 | Long et al. | 711/100 |
| 2005/0210101 A1* | 9/2005 | Janik | 709/203 |
| 2005/0235079 A1 | 10/2005 | Chen | |
| 2005/0246433 A1 | 11/2005 | Carrigan et al. | |
| 2005/0254775 A1 | 11/2005 | Hamilton et al. | |
| 2005/0270296 A1* | 12/2005 | Liu et al. | 345/501 |
| 2005/0278728 A1 | 12/2005 | Klementiev | |
| 2006/0253669 A1* | 11/2006 | Lobdell | 711/162 |
| 2006/0294254 A1* | 12/2006 | Emerson et al. | 709/238 |
| 2007/0079008 A1 | 4/2007 | Leibovich et al. | |
| 2007/0115992 A1* | 5/2007 | Weinstock et al. | 370/392 |

OTHER PUBLICATIONS

File History of Reissue U.S. Patent No. 5,732,212, Apr. 11, 2002. Part 2.
File History of U.S. Appl. No. 10/032,325, Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.
Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex v. Raritan*, Southern District of New York, Case No. 01-CV-4435, vol. 1, Jan. 2002.
Trial Transcript, *Apex v. Raritan*, Southern District of New York, Case No. 01-CV-4435, vol. 2, Jan. 2002.
Trial Transcript, *Apex v. Raritan*, Southern District of New York, Case No. 01-CV-4435, vol. 3, Jan. 2002.
Trial Transcript, *Apex v. Raritan*, Southern District of New York, Case No. 01-CV-4435, vol. 4, Jan. 2002.
Trial Transcript, *Apex v. Raritan*, Southern District of New York, Case No. 01-CV-4435, vol. 5, Jan. 2002.
Trial Transcript, *Apex v. Raritan*, Southern District of New York, Case No. 01-CV-4435, vol. 6, Jan. 2002.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex et al, Products Brochure, APX 316564-316621.
Apex et al, Products Brochure, APX 316848-316909.
Apex et al, Products Brochure, APX 316910-316969.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix 1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).

Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiff's Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
Trial Transcript, *Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp.* v. *Raritan Computer, Inc.*, Civil Action No. 1:01 CV-04435(PKC), United States District Court for the Southern District of New York.
The International Search Report and Written Opinion issued on Feb. 5, 2008, in related PCT Application No. PCT/US07/01497.
The Office Action mailed on Dec. 13, 2007 in the related U.S. Appl. No. 11/344,443.
The Office Action mailed on May 28, 2008 in the related U.S. Appl. No. 11/344,443.
The Notice of Allowance mailed on Sep. 5, 2008 in the related U.S. Appl. No. 11/344,443.
Defendant Raritan Computer Inc.'s Response to Plaintiff's First Set of Post Remand Interrogatory Requirements to Raritan (No. 1R-16R). (Dec. 16, 2004).
Avocent Redmond's Supplemental Responses to Raritan's Second Set of Post-Remand Interrogatories (No. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621, Apr. 1994.
Apex et al, Products Brochure, APX 316848-316909, Sep. 1993.
Apex et al, Products Brochure, APX 316910-316969, Nov. 1992.
Apex's Sales Brochure, Sep. 1, 1998, 1 page.

* cited by examiner

KEYBOARD, MOUSE, AND VIDEO (KVM) SESSION CAPTURE SYSTEM THAT STORES AND CAN PLAYBACK PORTIONS OF LIVE KVM SESSION VIA FORENSIC CAPTURE MODULE

CROSS-REFERENCE TO RELATED APPLICATIONS

This application is a divisional of application Ser. No. 11/344,443, filed on Jan. 31, 2006 now U.S. Pat. No. 7,478,182, entitled "KEYBOARD, VIDEO AND MOUSE SESSION CAPTURE," which is incorporated herein by reference.

BACKGROUND OF THE INVENTION

1. Field of the Invention

The present invention relates to command center forensics ("CCF") that saves sessions of users who connect to servers through keyboard, video and mouse ("KVM") switches. The reason for saving the KVM sessions is for purposes of troubleshooting, enabling failure analysis, auditing, logging, ensuring privacy, providing security surveillance, and facilitating maintenance. The KVM session includes keystrokes, mouse actions and full-motion video output of the server as well, e.g., KVMoIP (KVM over Internet Protocol) data. A viewer application is then used to view the captured files later.

2. Description of Related Art

In the event of a problem with server security, changes and/or data loss may arise. It would be desirable to have a saved KVM session that shows who and how the data was compromised.

In the event of a problem with server maintenance, a system administrator performing upgrades or other kinds of software maintenance on the server may cause a failure or error. It would be desirable to have a recorded KVM session that can easily show the exact steps taken leading to the failure of the server.

The inventors are unaware of any present commercial practice that addresses these server and maintenance problems effectively in a KVM environment. There are products sold as "PC Parent", "Spy Capture", etc, mostly to watch kids, students, spouses and employees, making sure they don't do anything undesired on their PCs. They are all windows applications, and do not perform continuous video recording. A type of video recording is done for television using a TiVo function.

These types of products are windows-based software that secretly records snapshots of the user's screen, records keystrokes and mouse movements. However, this is done at the operating system (OS) level, requiring Windows. It would be desirable to record sessions from the KVM switch, therefore not requiring any particular OS, and to pre-boot activity such as BIOS and POST screens.

BRIEF SUMMARY OF THE INVENTION

One aspect of the invention resides in storing KVMoIP data arising during a KVM session from a KVM switch and yet storing the KVMoIP data in a manner that enables retrieval of the KVMoIP data from storage for searching and playback purposes. Such is desirable over just displaying KVMoIP data.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE PREFERRED EMBODIMENTS

Figure 1:
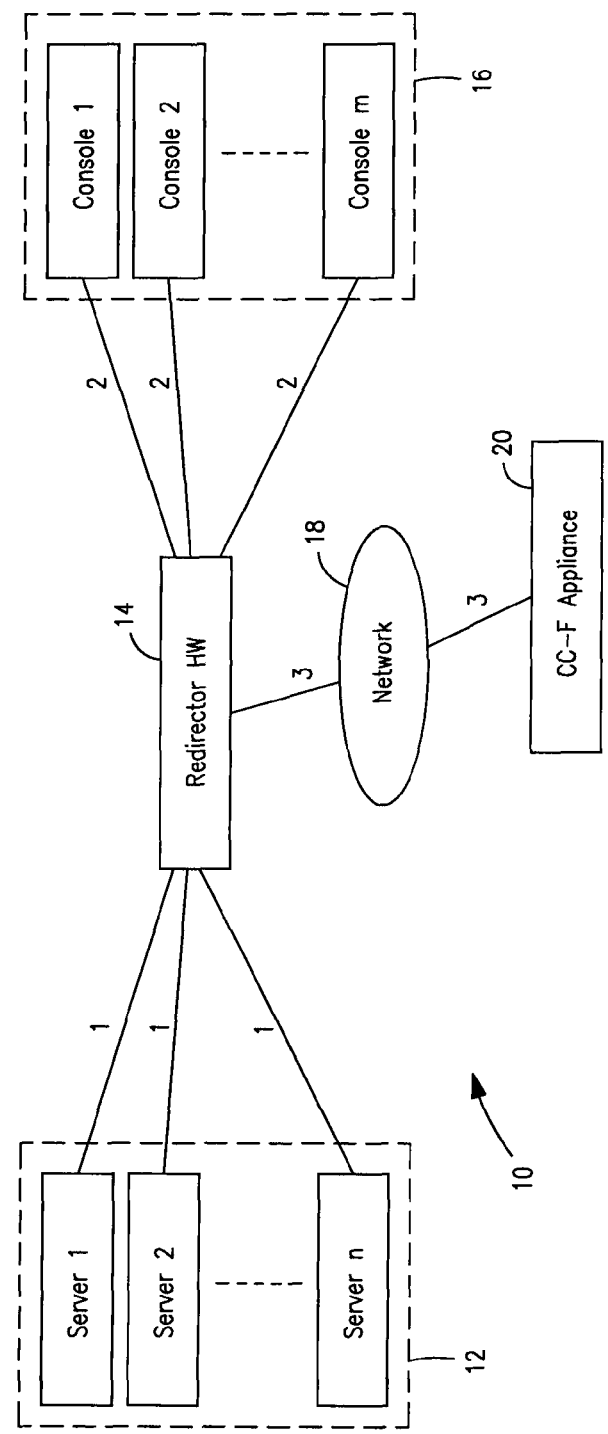
FIG. 1 is a schematic diagram of a command center forensics in accordance with the invention.

FIG. 1 shows command center forensics (CCF) 10 that records KVM activity of servers for purposes of troubleshooting, failure analysis, auditing, logging, privacy and security surveillance, including server security and server maintenance.

The CCF 10 includes redirector HW 14 to which the plurality of servers 12 are in communication via connections 1 and to which a plurality of consoles 16 (such as remote consoles) are in communication via connections 2. The redirector HW 14 uses a network 18 to communicate with a CCF appliance 20 via connections 3.

The connections 1 may be conventional KVM cables (PS/2 keyboard, mouse and HDB 15 monitor). If the server has a serial console, the connection would be a conventional serial cable, such as DB9.

The connections 2 may be conventional KVM cables and/or serial cables. The consoles 16 may be a regular keyboard, mouse and monitor, an analog KVM switch or a digital KVM switch, depending upon desired system configuration.

The connections 3 may be Ethernet cables. The redirector HW 14 converts the KVM signals to transmission control protocol/Internet protocol (TCP/IP) using a KVMoIP, such as the KVMoIP that is furnished by Raritan Computer. The redirector HW 14 then sends the data through the network 18 to the CCF appliance 20 for storage. The CCF appliance 20 is configured also to support RS-232 console recording of devices such as routers.

The redirector HW 14 may be any KVM over Internet Protocol (IP) device with the forensics software/firmware of the present invention, i.e., computer readable encoded media. Such KVM over IP devices are exemplified by a Raritan Computer Peppercorn LARA Express device, and a Raritan Computer Dominion KX digital KVM switch device, a Raritan Computer KX101 switch device and a Raritan Computer NGKX101 switch. Preferably, such redirector HW 14 supports RS-232 consoles as well. The redirector HW 14 with the forensics software/firmware of the present invention may be considered forensics computer interface modules (CIMs).

Figure 2:
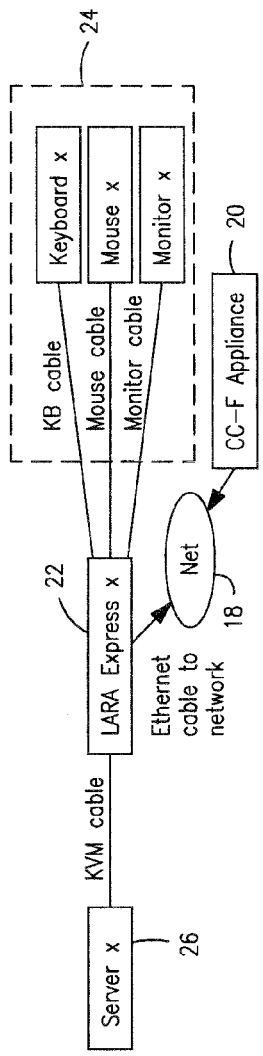
FIG. 2 is a schematic diagram of a command center forensics in accordance with a first embodiment, in which the redirector hardware ("HW") of FIG. 1 is exemplified by a Raritan Computer Peppercorn LARA Express device.

Turning to FIG. 2, the redirector HW 14 of FIG. 1 is exemplified by the Raritan Computer Peppercorn LARA Express device 22 and a conventional KVM console 24. One Raritan Computer Peppercorn LARA Express device 22 sits in between a server 26 and the associated KVM console 24. KVM data to and from the conventional KVM console 24 is read and digitized by the Raritan Computer Peppercorn LARA Express device 22 and sent to the CCF appliance 20 for storage. The link between the Raritan Computer Peppercorn LARA Express device 22 and the server x 26 and the conventional KVM console 24 may be through keyboard (KB) cable (PS/2 keyboard), mouse cable and monitor cable (KCB15). The link from the Raritan Computer Peppercorn LARA Express device 22 to the CCF appliance 20 via the network 18 may be with Ethernet cables.

Figure 3:
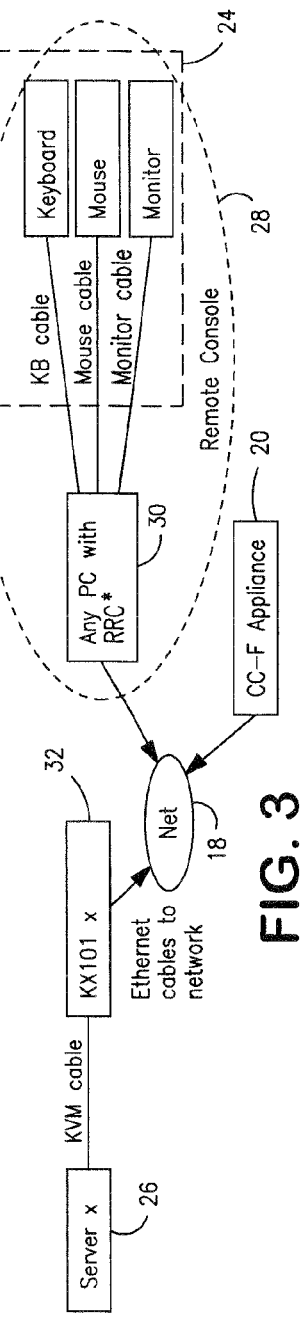
FIG. 3 is a schematic diagram of a command center forensics in accordance with a second embodiment, for which the redirector HW of FIG. 1 is exemplified by a Raritan Computer KX101 switch device.

Turning to FIG. 3, the KVM console 24 of FIG. 2 becomes part of a remote console 28 that also includes any personal computer ("PC") preferably equipped with Raritan remote client software ("RRC") 30. Instead of the Raritan Computer Peppercorn LARA Express device 22 of FIG. 2 as the redirector HW 14 of FIG. 1, a Raritan Computer KX101 switch device 32 is used. The KX101 switch device 32 provides KVMoIP control from a remote console control to the server 26 and sends a second, identical copy of that console session to the CCF appliance 20 for storage.

Figure 4:
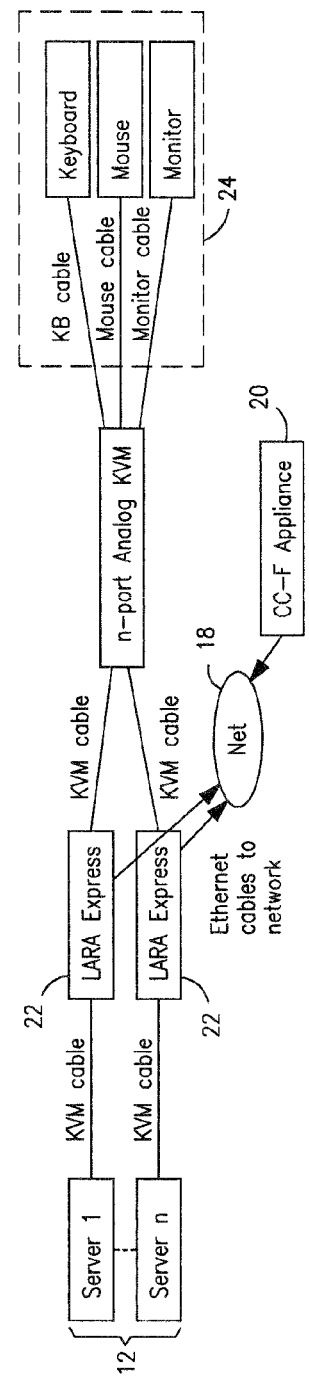
FIG. 4 is a schematic diagram of a command center forensics in accordance with a third embodiment, for which the redirector HW 14 is exemplified by the Raritan Computer Peppercorn LARA Express device of FIG. 2 and with an analog KVM switch.

Turning to FIG. 4, a modification of the arrangement as in FIG. 2 is depicted in that there is shown one KVM console 24 for a plurality of servers 12 each in communication with an associated Raritan Computer Peppercorn LARA Express device 22. Also, an n-port analog KVM device is employed to accommodate each of the Raritan Computer Peppercorn LARA Express devices 22 in communicating the KVM console 24.

Figure 5:
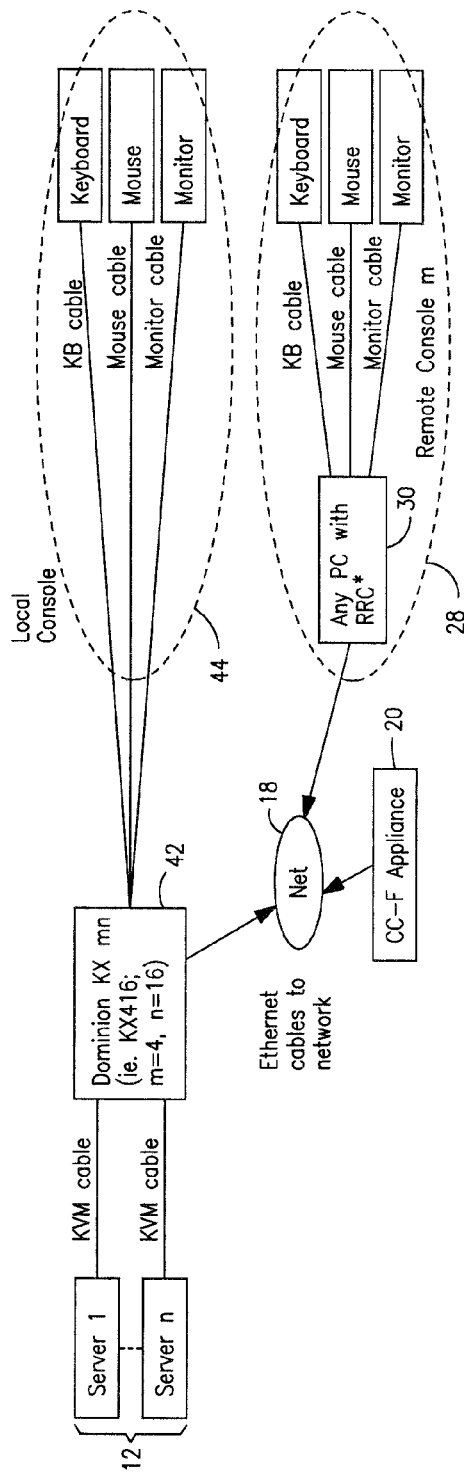
FIG. 5 is a schematic diagram of a command center forensics in accordance with a fourth embodiment, for which the redirector HW 14 is exemplified by a Raritan Computer Dominion KX Digital KVM switch.

Turning to FIG. 5, the redirector HW 14 of FIG. 1 is exemplified by Dominion KX digital KVM switch 42. The remote console 28 of FIG. 3 is likewise provided. The Dominion KX digital KVM switch 42 can allow a single local console 44 as well a multiple remote consoles 28 to communicate using remote client software such as that provided by Raritan Computer and sends an identical copy of active sessions to the CCF appliance 20 for storage. The values for m and n are exemplary and depend upon the models of Dominion KX digital KVM switch used.

Figure 6:
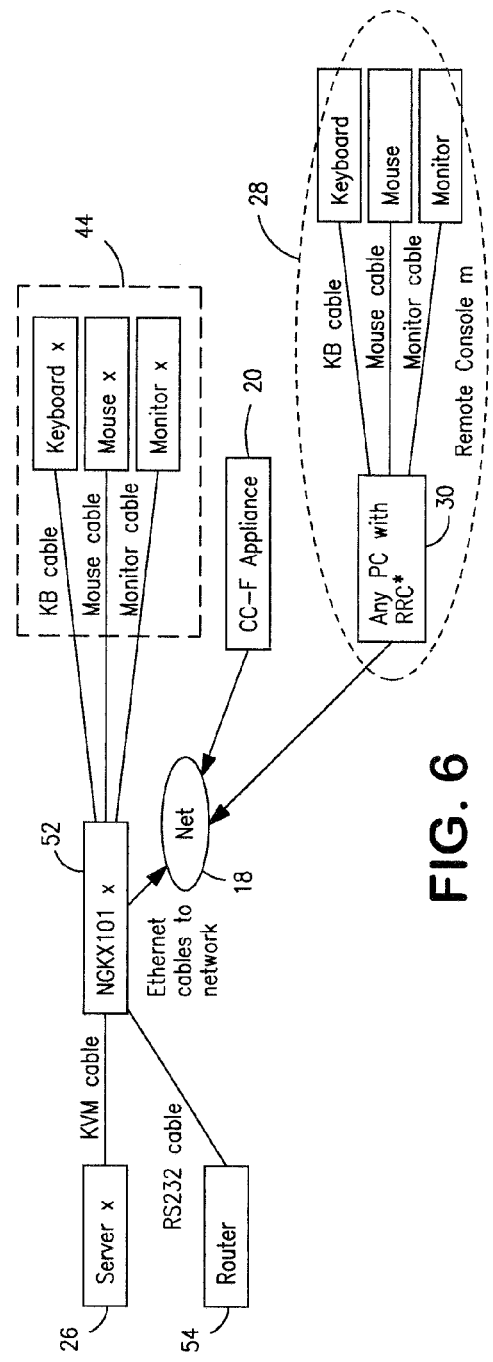
FIG. 6 is a schematic diagram of a command center forensics in accordance with a fifth embodiment, for which the redirector HW 14 is exemplified by a Raritan Computer NGKX101 switch.

Turning to FIG. 6, the redirector HW 14 of FIG. 1 is exemplified by a Raritan Computer NGKX101 switch 52 with serial console and remote console capabilities instead of the Dominion KX digital KVM switch 42 of FIG. 5. A router 54 may be provided to communicate with the NGKX101 switch 52 via RS-232 cable. As in FIG. 5, a local console 44 and a remote console 28 may be provided.

In a digital KVM switch setup in accordance with an embodiment of the invention, the digital KVM sends captured KVMoIP data to client machines running RRC so that the remote users can remotely control computers. RRC simply displays the video on screen, takes keyboard and mouse inputs and sends them to the redirector HW 14 to control the computer. To create a novel feature of the CCF appliance 20, KVMoIP data is written to disk instead of just displaying it on client software.

Redirector HW 14 preferably is synced with $3^{rd}$ party network time protocol (NTP) time servers for use in recording. Further, all KVM data being sent to the CCF appliance 20 preferably is time-stamped, strongly encrypted (secure sockets layer protocol (SSL), digital signatures), and include all possible identifiers such as the IP address of the Redirector HW 14. Also, if the Redirector HW is a KX KVM, the KVM data includes target server IP, server name, KX user name, and remote console IP if remote, or indication if local console used. The administrator can turn on and off SSL communication between redirector HW and CCF appliance for faster capture rate (SSL is CPU-intensive).

The CCF appliance 20 saves video data as a separate flat file while keyboard and mouse data are stored in a database for quick searching The administrator can setup profiles for each redirector HW 14 target. Profiles would have many defined settings such as items (1) to (9) as follows:

(1) Recording priority. Each CCF appliance 20 has a predetermined maximum number of simultaneous sessions being recorded. For example, a maximum of 8 sessions may be recorded simultaneously (set in software). However, an administrator can setup x>8 Redirector HW units. Therefore, the administrator should assign a priority to each redirector HW, from 1 to x, so that the CCF appliance 20 can record the highest priority sessions only.

(2) Keystroke recording. It can be set to RECORD ALL, RECORD NONE, FILTERED RECORD, FILTERED PLAYBACK. The first two are self-explanatory. FILTERED RECORD records only keyboard commands (i.e. CTRL+P, F7, CTRL+ALT+M, etc), but not plain text (alphanumeric keys without modifier keys. FILTERED PLAYBACK records all keystrokes, but does not display keystrokes on playback in the viewer. This is necessary for the search mechanism only (i.e., search for sessions with keystroke string "democrat" but will not be displayed on playback).

(3) Selecting video quality. The administrator can select color depth (2 bits to a15 bits), and distance between keyframes (full frame capture instead of delta only).

(4) Recording trigger. The administrator can set recording triggers: LOCAL PORT ACTIVITY (begins recording if keyboard, mouse or video activity is detected), REBOOT (if reboot is sensed by keyboard initialization and/or boot screen resolution change), and in the case of Dominion KX, KX101, and NGKX devices, USER LOGIN (records when certain user logs into the KVM), or TARGET CONNECTED (records when a certain target on the KVM is selected).

(5) Setting a duration of the recording. It can be until USER LOGS OFF, LOCAL PORT ACTIVITY TIMEOUT PERIOD in seconds, or PREDETERMINED TIME in dd:hh:mm:ss.

(6) Setting time to deletion (7) Arranging viewing permissions (8) Archiving permissions (9) Configuring the CCF appliance 20 to communicate periodically with external syslog servers with time-stamps at least, or log all CCF events.

The CCF appliance 20 preferably has PCI-X slots so that end-users can upgrade it with add-in Fiber Channel cards to increase storage capacity. The CCF appliance 20 preferably supports Secure Deletion using DOD 522.22-M standard.

The CCF appliance 20 preferably has an undeletable log of all stored sessions files. It will keep track of the session file data, which users/administrators have viewed it, dates and times viewed, location (whether internal, archived externally, or deleted).

A browser-based application for searching and playback may be provided, including, preferably, a Java-based playback client. An SSL-encrypted link between the browser-based application and the CCF appliance 20 may be provided for security.

A searching mechanism may be provided for the browser-based application to search across multiple sessions as well as within sessions using:

If applicable, keystroke search, with results ranked (will include nearest hits, not just exact matches)

Mouse click patterns (double click, right click, etc)

Date, Time, User ID, Target IP or IP address

Boolean combination of any of the above

Further, utility to print out keylogs and screen shots may be provided, as well as an application to transcode video to any standard video format.

Preferably, keystrokes and mouse clicks are displayed visually and session information such as User ID, Target ID, IP address, Date, Time, Duration, etc also is displayed on playback.

While the foregoing description and drawings represent the preferred embodiments of the present invention, it will be understood that various changes and modifications may be made without departing from the spirit and scope of the present invention.

What is claimed is:

1. An apparatus for use in a Keyboard, Video, Mouse (KVM) system comprising:
    at least a console for remotely managing at least one server via a network, wherein said management is provided by bidirectionally coupling KVM signals signal between the console and the server, and each of the KVM signals has a source and a destination;
    a first unit for coupling each of the KVM signals to their respective destinations and for simultaneously providing a representation of each of the KVM signals at an output coupled to a network;
    a second unit coupled via the network to the output of the first unit, wherein the second unit is configured to store each of said representations; and
    a browser-based search and playback application configured to access the second unit, to search for said stored representations of said KVM signals using one or more of keystrokes or mouse click patterns of said KVM signals, date, time, user ID or IP address information to identify one or more KVM sessions of interest, and to initiate a playback of stored representations for said sessions of interest, wherein said apparatus is responsive to command signals that direct the apparatus to store all or a predetermined portion of the KVM signals.

2. The apparatus of claim 1 wherein each representation is a replica of its associated KVM signal and said second unit stores each replica.

3. The apparatus of claim 1 wherein each representation is a packetized version of its associated KVM signal and said second unit stores each such representation.

4. The apparatus of claim 1 wherein the command signals direct the apparatus to store KVM signals upon a predetermined condition.

5. The apparatus of claim 4 wherein the predetermined condition is a reboot condition.

6. The apparatus of claim 4 wherein the server provides video signals having a predetermined screen resolution and said predetermined condition is a change in said screen resolution.

7. The apparatus of claim 6 wherein the command signal specifies the quality of the video signal stored.

8. The apparatus of claim 1 wherein the second unit is configured to store representations of KVM signals from different consoles destined for different servers simultaneously.

9. The apparatus of claim 1 wherein said second unit is configured to retrieve stored representations of said KVM signals.

10. The apparatus of claim 9 wherein said second unit is responsive to retrieval signals provided by said playback application.

11. The apparatus of claim 10 wherein the retrieval signals direct the second unit to retrieve all or a portion of the stored representations.

12. The apparatus of claim 1 wherein the stored representations of the KVM signal are time stamped.

13. The apparatus of claim 1 wherein the stored representations of the KVM signal are encrypted.

14. The apparatus of claim 1 wherein the second unit is configured to store only the predetermined portion of the KVM signals in a filtered recording mode.

15. The apparatus of claim 11 wherein the second unit is configured to retrieve only the portion of the stored representations in a filtered playback mode.

* * * * *